Patented Aug. 30, 1927.

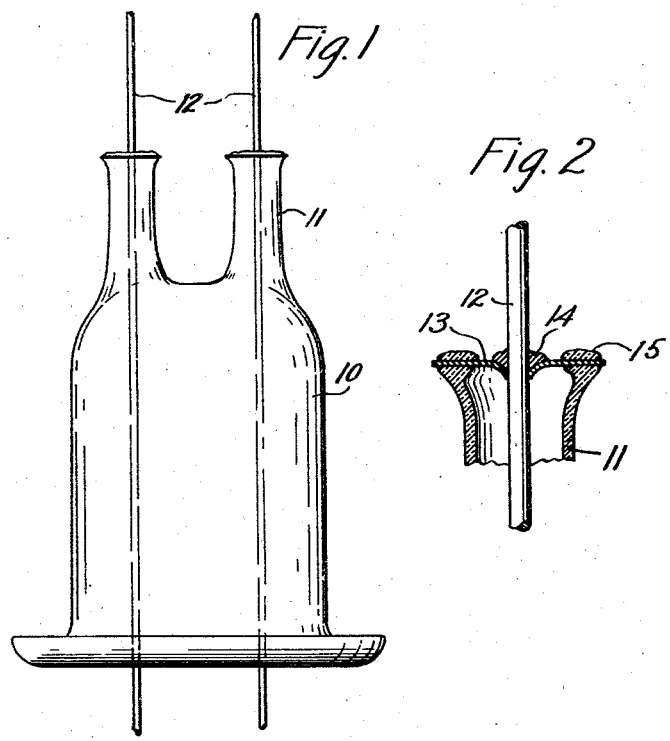

1,640,469

UNITED STATES PATENT OFFICE.

VICTOR L. RONCI, OF BROOKLYN, NEW YORK, ASSIGNOR TO WESTERN ELECTRIC COMPANY, INCORPORATED, OF NEW YORK, N. Y., A CORPORATION OF NEW YORK.

LEADING-IN CONDUCTOR.

Application filed May 2, 1923. Serial No. 636,078.

This invention relates to electron discharge devices and pertains more especially to leading-in conductors for the electrodes of high power vacuum tubes.

This invention has for its object the formation of a gas-tight seal for a leading-in conductor capable of carrying large currents.

This object is attained by providing a metal disc sealed to the end of a glass tube according to the manner disclosed in the patent to W. G. Houskeeper, 1,293,441, and having a wire passing through the disc and soldered thereto. The wire and disc are preferably composed of a highly conductive metal and are joined together by a relatively high melting point solder containing no volatilizable material. A solder highly suitable for this purpose is an alloy having as one of its constituents the metal of which the disc and leading-in wire are composed. In this alloy the proportions of its constituents are such that the addition to the alloy of more of the metal composing the disc and leading-in wire increases the melting point of the solder. This insures that no leak will develop in the joint during the fusing of the disc to the glass tube as a result of the solder softening at the temperature at which the fusing operation is conducted.

Referring now to the drawings, Fig. 1 discloses the stem of an electron discharge device having leading-in wires sealed therein and Fig. 2 is an enlarged sectional view through one of the seals.

The stem 10 has two tubular projecting glass members 11 through which extend the leading-in wires 12. Each of these leading-in wires passes through a thin disc 13 to which it is attached by solder 14. Each disc 13 is fused to the end of one of the glass tubes 11 and a ring of glass 15 is fused to the opposite side of the disc, whereby is attained a vacuum tight joint between the glass tube and the disc. The leading-in wires and the discs are preferably composed of copper and are joined together by means of a silver copper alloy solder. The proportions of copper and silver of the alloy are such that the melting point thereof is about the same as that of pure silver but that if more copper be added to the alloy, the melting point will be raised instead of being lowered as would be the case with sterling silver. Thus, when the leading-in wire and the disc are soldered together, any copper which may be melted out of the disc and alloyed with the solder, increases the melting point thereof. When the disc of a seal made in this manner is fused to the end of the glass tube, there is no danger of the seal failing at the temperature to which it is subjected while the disc is being fused to the glass.

It has been found that a copper silver alloy containing approximately 80% of copper and 20% of silver has a melting point approximately the same as that of pure silver and the addition of more copper to the alloy increases its melting temperature. Such a solder has been found to be very satisfactory for this purpose and seals between discs and leading-in wires made with this solder are maintained tight during the fusing of the disc to the glass.

What is claimed is:

The method of making a leading in conductor comprising a copper wire passing through a copper disc which consists in joining the wire to the disc by an alloy of copper and silver the melting point of which is substantially the same as that of pure silver, the proportions of copper and silver being such that the addition thereto of copper from said wire and disc during the soldering operation will raise the melting temperature of the solder above that of silver.

In witness whereof, I hereunto subscribe my name this 30th day of April A. D., 1923.

VICTOR L. RONCI.